(12) United States Patent
Zhao et al.

(10) Patent No.: US 11,795,719 B1
(45) Date of Patent: Oct. 24, 2023

(54) CONTROL METHOD OF AN UNDERWATER ROBOT BASED ON ULTRASONIC RADAR, UNDERWATER ROBOT AND NON-VOLATILE STORAGE MEDIUM

(71) Applicant: COCLEAN Technologies, Co., Ltd., Suzhou (CN)

(72) Inventors: Fei Zhao, Suzhou (CN); Ye Zhao, Suzhou (CN)

(73) Assignee: COCLEAN Technologies, Co., Ltd., Suzhou (CN)

( * ) Notice: Subject to any disclaimer, the term of this patent is extended or adjusted under 35 U.S.C. 154(b) by 0 days.

(21) Appl. No.: 18/158,027

(22) Filed: Jan. 23, 2023

(30) Foreign Application Priority Data

Jun. 13, 2022 (CN) .......................... 202210670612.6

(51) Int. Cl.
*E04H 4/16* (2006.01)
*G01S 15/08* (2006.01)
*G01S 15/89* (2006.01)
*G05D 1/06* (2006.01)

(52) U.S. Cl.
CPC ............ *E04H 4/1654* (2013.01); *G01S 15/08* (2013.01); *G01S 15/89* (2013.01); *G05D 1/0692* (2013.01)

(58) Field of Classification Search
CPC ....... E04H 4/16; E04H 4/1636; E04H 4/1654; G01S 15/08
See application file for complete search history.

(56) References Cited

U.S. PATENT DOCUMENTS

| 10,494,827 | B2* | 12/2019 | Attar | G05D 1/0033 |
| 2013/0152970 | A1* | 6/2013 | Porat | E04H 4/1654 134/18 |
| 2020/0063454 | A1* | 2/2020 | Attar | E04H 4/1654 |
| 2021/0040760 | A1* | 2/2021 | Duffaut | E04H 4/16 |

FOREIGN PATENT DOCUMENTS

WO WO-2019040653 A1 * 2/2019 ........... E04H 4/1654

* cited by examiner

*Primary Examiner* — Michael D Jennings

(57) ABSTRACT

An operating method of an underwater robot based on ultrasonic radar, an underwater robot and a non-volatile storage medium is described. The method comprises: controlling the underwater robot to travel in a first direction from any first position at a bottom of a pool to a second position close to a wall of the pool based on an electrical signal from the ultrasonic radar; controlling the underwater robot to travel from the second position along the wall to a third position to generate an along-wall path; comparing the along-wall path with a pool bottom model, and determining the position information of the third position in the pool bottom model; and controlling the underwater robot to travel along a spiral path starting from the third position to traverse the whole bottom based on the position information.

19 Claims, 4 Drawing Sheets

CONTROL METHOD OF AN UNDERWATER ROBOT BASED ON ULTRASONIC RADAR, UNDERWATER ROBOT AND NON-VOLATILE STORAGE MEDIUM

CROSS-REFERENCE

This application claims priority to and the benefit of Chinese Patent Application No. 202210670612.6, entitled "Path planning method of an underwater robot based on ultrasonic radar and the underwater robot," filed on Jun. 13, 2022. The entire content of this application is incorporated herein by reference in its entirety.

TECHNICAL FIELD

The present application relates to automatic control field, more specifically, to an operating method of an underwater robot based on ultrasonic radar, underwater robot and non-volatile storage medium.

BACKGROUND

Underwater robot, also known as unattended remote-control submersible device, is an operating robot that works underwater. Underwater robot may be, for example, a cleaning robot. When working underwater, the cleaning robot needs to perform path-planning to achieve a full coverage of the bottoms of swimming pools, feeding pools, treatment pools and so on. In this way, it may be ensured that the cleaning robot completes the cleaning operation for the bottom of the pools comprehensively, quickly and efficiently.

There are two problems with the underwater robot in the process of underwater operation. First, due to underwater operation, the robot may only detect something within a limited distance range. Therefore, when the underwater robot is placed in the pool, it is difficult to accurately determine the position of the underwater robot. In this way, the underwater robot may not conduct cleaning operation on the bottom of the pool in a preset cleaning mode. At the same time, it may not be determined whether the underwater robot has conducted a comprehensive operation on the bottom of the pool, which affects operation quality. Second, current travelling paths of the underwater robot are mostly S-type, snake type, or straight. In the process of the travelling of the underwater robot, due to sharper turns and more braking conditions, a larger loss may be caused to the underwater robot so as to affect its life.

Therefore, it is urgent to design a new operating method of the underwater robot to solve the above problems.

SUMMARY

In order to solve the problems at least partially in prior arts, according to an aspect of the present invention, an operating method of an underwater robot based on ultrasonic radar is provided. The operating method comprises the following steps: S110, controlling the underwater robot to travel in a first direction from any first position at a bottom of a pool to a second position close to a wall of the pool based on an electrical signal from the ultrasonic radar; S120, controlling the underwater robot to travel from the second position along the wall of the pool to a third position to generate an along-wall path; S130, comparing the along-wall path with a pool bottom model, and determining the position information of the third position in the pool bottom model; and S140, controlling the underwater robot to travel along a spiral path starting from the third position at the bottom of the pool to traverse the whole bottom of the pool based on the pool bottom model.

Optionally, the step S110 includes: S111, randomly determining the first direction; S112, controlling the underwater robot to travel in the first direction from the first position, while detecting a surrounding wall of the pool based on the electrical signal from the ultrasonic radar; S113, when the wall of the pool is detected, determining a second direction in which the distance between the underwater robot and the detected wall is shortest; S114, turning from the first direction to the second direction; and S115, controlling the underwater robot to travel to the second position in the second direction.

Optionally, the step S110 further includes: at the first position, detecting a surrounding wall of the pool based on the electrical signal from the ultrasonic radar; when the wall of the pool is detected, defining the first direction to be the second direction, and controlling the underwater robot to travel to the second position in the second direction; when no wall is detected, executing the steps from the step 111 to the step 115.

Optionally, the method further includes: in the process of controlling the underwater robot to travel in the first direction from the first position, and/or in the process of controlling the underwater robot to travel to the second position in the second direction, acquiring a current travelling direction of the underwater robot in real time by an attitude sensor, and based on the current travelling direction and a previous moment travelling direction, keeping the travelling direction of the underwater robot in the same direction in each process respectively.

Optionally, the step S140 includes: controlling the underwater robot to travel starting from the third position along the wall of the pool for one lap to reach the third position again; circularly executing the following operations until the distance between the underwater robot and the center of the bottom of the pool is less than a distance threshold; from a current position, controlling the underwater robot to move a first distance toward the center of the bottom of the pool to reach a position closer to the center; controlling the underwater robot to travel starting from the closer position to the center in a lap parallel to the wall of the pool for one lap.

Optionally, the method further includes: while controlling the underwater robot to travel along the spiral path starting from the third position at the bottom of the pool, controlling the underwater robot to execute an operation at a preset width to complete the operation for the bottom of the pool, wherein the first distance is equal to a product of the preset width and a proportional coefficient; and wherein the proportional coefficient is 0.8~1.

Optionally, the method further includes: generating the pool bottom model by setting size parameters of an edge profile of the bottom of the pool; collecting an image of the bottom of the pool and generating the pool bottom model based on the image; or controlling the underwater robot to travel along the wall of the pool for at least one lap at the bottom of the pool, and at the same time, detecting a position and posture of the underwater robot in real time and generating the pool bottom model based on the position and posture detection result.

Optionally, after said collecting an image of the bottom of the pool and generating the pool bottom model based on the image, the method further includes: controlling the underwater robot to travel at the bottom of the pool along the wall of the pool for at least one lap; while detecting a real time position of the underwater robot, and determining the edge profile of the bottom of the pool based on the position detection result; amending the pool bottom model based on the determined edge profile.

Optionally, the method further includes: S150, while controlling the underwater robot to travel along the spiral path starting from the third position at the bottom of the pool, displaying the travelling path of the underwater robot in real time in a graphical user interface; S160, acquiring evaluation information of the travelling path of the underwater robot; and S170, optimizing control parameters based on the evaluation information, wherein the control parameters are used to control the underwater robot to travel along the spiral path thereafter.

Optionally, the control parameters comprise a distance parameter between adjacent paths in the spiral path, the step S150 includes: rasterizing the path display area; displaying the travelling path in the path displaying area in real time, wherein the grids corresponding to the passed portion of the travelling path and the grids corresponding to the un-passed portion of the travelling path are displayed in different styles; the step S160 includes: determining the evaluation information based on the proportion of the number of the grids corresponding to the passed portion of the travelling path to the total number of the grids after the underwater robot stops travelling; the step S170 includes: adjusting the distance parameter when the number of the grids corresponding to the passed portion of the travelling path does not reach 100% of the total number of the grids.

Optionally, the method further includes: while controlling the underwater robot to travel along the spiral path starting from the third position at the bottom of the pool, controlling the underwater robot to execute an operation to complete the operation for the bottom of the pool; the graphical user interface further includes operable controls; the control parameters include travelling area, travelling speed and/or operation intensity; the step S150 includes: rasterizing the path display area; displaying the travelling path in the path displaying area in real time, wherein the grids corresponding to the passed portion of the travelling path and the grids corresponding to the un-passed portion of the travelling path are displayed in different styles; the step S160 includes: determining the evaluation information in response to an operation on the operable controls by the user, and the evaluation information includes an operation quality score for an area corresponding to at least a part of the grids in the path display area; the step S170 includes: adjusting the travelling area, the travelling speed and/or the operation intensity based on the operation quality score.

Optionally, the ratio of the length of the along-wall path to the circumference of the bottom of the pool is 0.2~2.

According to another aspect of the present disclosure, there is provided an underwater robot. The underwater robot includes a vehicle body provided with at least one ultrasonic radar and a moving device; and a processor in communication with the at least one ultrasonic radar and configured to generate, in response to an electrical signal of the ultrasonic radar, at least one control signal to control the moving device to move the vehicle body at a bottom of a pool.

Optionally, the underwater robot is used to clean the bottom of the pool while the underwater robot is travelling.

Optionally, the underwater robot includes a plurality of ultrasonic radars facing different directions respectively, Optionally, the underwater robot includes one ultrasonic radar, which is rotatable relative to the vehicle body.

Optionally, the underwater robot further includes an attitude sensor configured to acquire a current travelling direction of the underwater robot in real time.

Optionally, the attitude sensor includes a gyroscope, an accelerometer and/or an electronic compass.

Optionally, the underwater robot further includes a communication device connected with the processor and configured to output the travelling path of the underwater robot to a computing device, to display the travelling path on a display of the computing device.

According to yet another aspect of the present disclosure, there is provided a non-volatile storage medium with program instructions stored thereon. The program instructions when running are used to execute the above mentioned operating method.

The operating scheme of the underwater robot based on the ultrasonic radar according to the embodiment of the present application can realize the accurate positioning and rapid and efficient control of the underwater robot at the bottom of the pool. In addition, the operating scheme can also reduce the loss of the underwater robot and extend the life of the underwater robot.

A series of concepts in simplified forms are introduced in the content of the invention, which will be described in further details in the section of specific embodiments. The content section of the present invention is not meant to attempt to define the key features and essential technical features of the technical solution claimed to be protected, much less to attempt to determine the scope of protection of the technical solution claimed to be protected. The advantages and features of the present invention are described in detail below in conjunction with the drawings.

BRIEF DESCRIPTION OF THE DRAWINGS

The following drawings of the present invention are used herein as a part of the present invention for the purpose of understanding the present invention. The embodiments of the present invention and descriptions thereof are shown by the drawings for explaining the principles of the present invention. In the drawings.

DETAILED DESCRIPTION OF THE EMBODIMENTS

In the following descriptions, a lot of details are provided to enable a thorough understanding of the present invention. However, it can be understood by those skilled in the art that the following descriptions only exemplarily illustrate preferred embodiments of the present invention, and that the present invention can be implemented without one or more of such details. Furthermore, in order to avoid confusion with the present invention, some technical features well known in the art are not described in detail.

The embodiments of the present application provide an operating method of an underwater robot based on ultrasonic radar. The operating method of the underwater robot is used to plan a travelling path of the underwater robot at the bottom of a pool, and to control the underwater robot to traverse the bottom of the pool according to the planned path. In an embodiment according to the present application, firstly, the underwater robot is controlled to find and travel to a nearby position close to the wall of the pool from the placed position. Secondly, the underwater robot travels along the wall of the pool for a certain distance or one lap, and compares the travelling path with a three-dimensional model of the bottom of the pool to determine its current position. Finally, with the current position as a starting point, the bottom of the pool is divided into multiple successively connected ring-like paths according to the three-dimensional model, that is, path planning for the underwater robot is completed.

Figure 1:
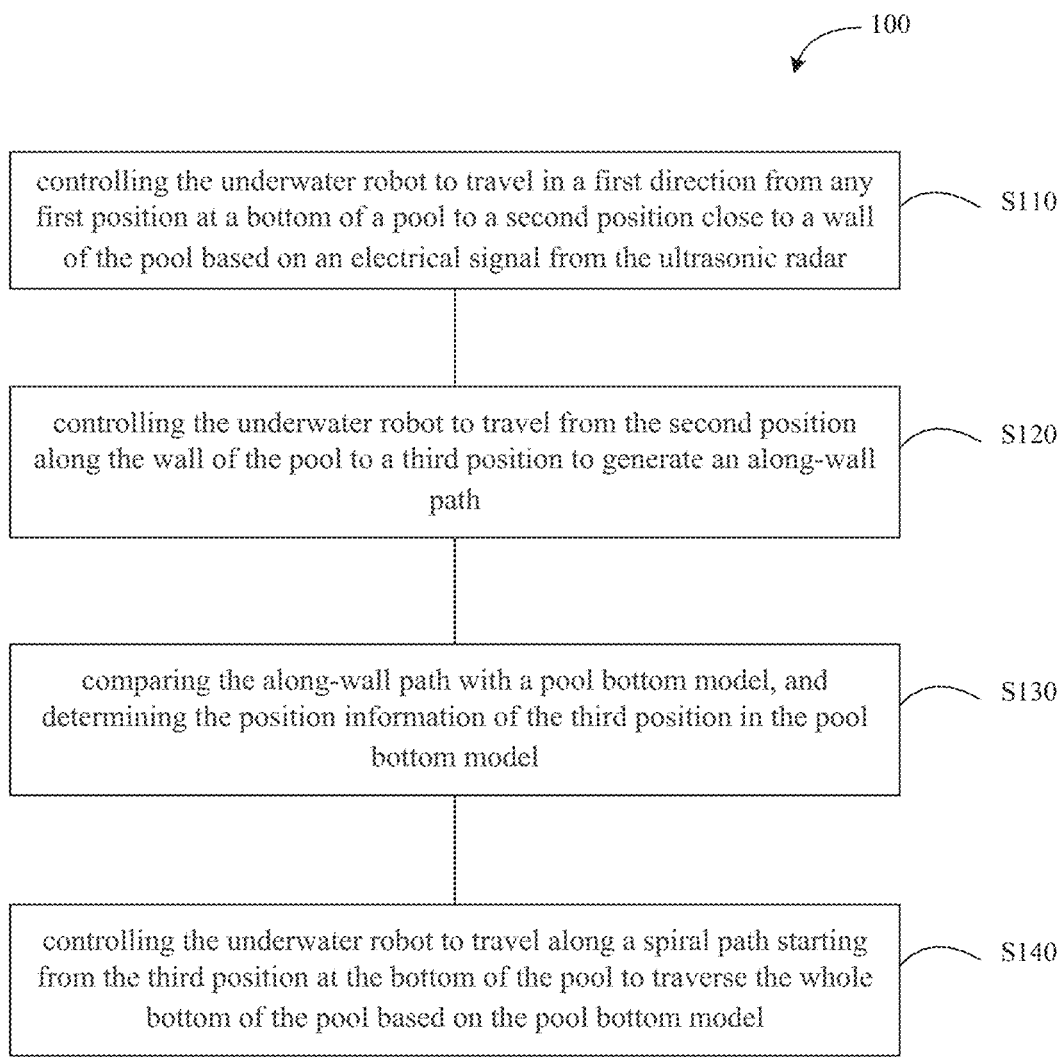
FIG. 1 illustrates a schematic flowchart of an operating method of an underwater robot based on ultrasonic radar according to an embodiment of the present application.

FIG. 1 illustrates a schematic flowchart of an operating method 100 of an underwater robot based on ultrasonic radar according to an embodiment of the present application. As shown in FIG. 1, the operating method 100 includes the following steps, namely S110, S120, S130 and S140.

In step S110, the underwater robot is controlled to travel in a first direction from any first position at the bottom of a pool to a second position close to the wall of the pool based on an electrical signal from the ultrasonic radar.

Figure 2A:
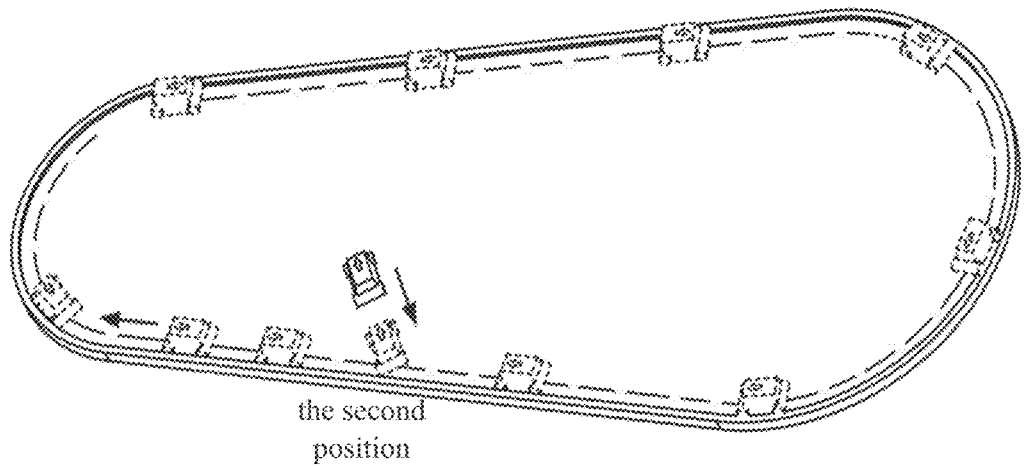
FIG. 2A illustrates a schematic diagram of an along-wall path of an underwater robot according to an embodiment of the present application.

The above pool may be, for example, a swimming pool, a sewage treatment pool, a feeding pool and so on. FIG. 2A illustrates a schematic diagram of an along-wall path of the underwater robot according to an embodiment of the present application. As shown in FIG. 2A, the bottom of the pool may be irregular in shape. Alternatively, the bottom of the pool may also be a regular shape, such as a circular or a rectangular and so on.

Since the underwater robot works in an underwater environment, it is difficult to accurately obtain its spatial position. In order to determine the specific position of the underwater robot, in the case that the outline of the bottom of the pool is known, the spatial position of any part of the wall of the pool may be determined according to the relative position of the part of the wall of the pool in the whole profile of the bottom of the pool. Accordingly, the position of the underwater robot may be determined according to the part of the wall of the pool that the underwater robot is close to. In other words, the wall of the pool may be used as a reference for the positioning of the underwater robot.

The underwater robot may be randomly placed at the bottom of the pool by an operator. The placed position may be an initial first position. The first position may be any position at the bottom of the pool. When the underwater robot is located at the first position of the bottom of the pool, the underwater robot may be activated to travel in a first direction. Exemplarily, the first direction may be any direction. The underwater robot is equipped with an ultrasonic radar. The ultrasonic radar may emit an ultrasonic signal. When an object exists within the range of the ultrasonic radar, a feedback signal may be generated after the ultrasonic signal reaching the object. The ultrasonic radar receives the feedback signal and then generates an electrical signal indicating the distance between the object and the ultrasonic radar based on the feedback signal. When the underwater robot is just close to the wall of the pool, the distance between the underwater robot and the wall of the pool may be determined based on the electrical signal from the ultrasonic radar. Alternatively, the first direction may also be determined as a specific direction according to the position of the underwater robot relative to the wall of the pool. Accordingly, the underwater robot may be controlled to start travelling in the first direction from any first position.

In the process of the travelling of the underwater robot, whether the underwater robot travels to the position close to the wall of the pool may be determined based on the electrical signal from the ultrasonic radar. When the underwater robot is determined to be closer to the wall of the pool based on the electrical signal from the ultrasonic radar, it may be determined that it travels to a second position close to the wall of the pool. FIG. 2A illustrates the second position of the underwater robot close to the wall of the pool.

If there is an obstacle(s) at the bottom of the pool, the vertical height of the ultrasonic radar of the underwater robot may be greater than the height of the obstacle. Thus, it may be ensured that the height of the obstacle is lower than the height of the ultrasonic signal emitted by the ultrasonic radar in a horizontal direction. In this way, it can avoid the adverse effect caused by the obstacle at the bottom of the pool on the robot's search for the second position close to the wall of the pool.

In step S120, the underwater robot is controlled to travel from the second position along the wall of the pool to a third position to generate the along-wall path.

Exemplarily, when the underwater robot is located at the second position, the travelling direction of the underwater robot may be adjusted. The adjusted travelling direction is along the wall of the pool. Based on the electrical signal from the ultrasonic radar, the underwater robot may be controlled to travel along the adjusted travelling direction to the third position to generate the along-wall path. Understandably, the third position is also close to the wall of the pool. In the process of the travelling, the third position may be determined based on the travelling distance of the underwater robot. For example, the travelling distance is preset to be a specific distance value, and then the underwater robot travels the specific distance value from the second position to reach the third position. Referring again to FIG. 2A, the dotted line illustrates the along-wall path. In the embodiment shown in FIG. 2A, the second position and the third position are the same position, and the along-wall path is the path that runs along the wall of the pool for one lap.

Exemplarily, the ratio of the length of the along-wall path to the circumference of the bottom of the pool is any value within an interval (0.2, 2). Where the circumference of the wall of the pool is 200 m, the along-wall path may be 40 to 400 m. Further, the ratio of the length of the along-wall path to the circumference of the pool may be in an interval (0.2, 0.5). The length of the along-wall path may be set according to the shape of the bottom of the pool. If there are more feature points at the edge of the bottom of the pool, the above ratio may be set smaller; otherwise, vice versa.

Based on the along-wall path of the above technical solution, the accurate positioning of the underwater robot in a shorter time period can be ensured. Accordingly, it can be ensured that the underwater robot traverses the whole bottom of the pool more quickly.

In step S130, the along-wall path is compared with the pool bottom model, and the position information of the third position in the pool bottom model is determined based on the comparison result.

The along-wall path of the underwater robot is compared with the pre-acquired pool bottom model to determine the coincidence part between the along-wall path and the pool bottom model. Optionally, the coincidence part includes feature points. The feature points are such as the corners of the wall of the pool or other specially-shaped sections. Based on the coincidence part, the current position of the underwater robot may be determined.

Figure 2B:
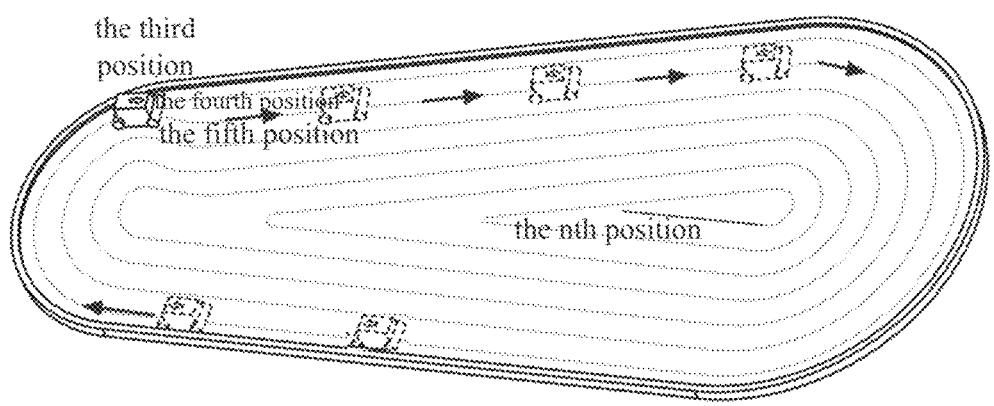
FIG. 2B illustrates a schematic diagram of a spiral path of an underwater robot according to an embodiment of the present application.

In step 140, the underwater robot is controlled to travel along a spiral path starting from the third position at the bottom of the pool to traverse the whole bottom of the pool based on the pool bottom model Exemplarily, according to the pool bottom model and the position information of the third position, the underwater robot may be controlled to travel at the bottom of the pool to traverse the bottom of the pool. That is, the travelling path of the underwater robot covers the whole bottom of the pool. The underwater robot travels along the spiral path starting from the third position. As mentioned above, the third position is close to the wall of the pool. The underwater robot may gradually move away from the wall of the pool along the spiral path and approach the center of the pool. Eventually, the underwater robot traverses the whole bottom of the pool. FIG. 2B illustrates a schematic diagram of the spiral path of the underwater robot according to an embodiment of the present application.

The operating scheme of the underwater robot based on the ultrasonic radar according to the embodiment of the present application can realize the accurate positioning and rapid and efficient control of the underwater robot at the bottom of the pool. In addition, the operating scheme can also reduce the loss of the underwater robot and extend the life of the underwater robot.

Exemplarily, the step S110 of controlling the underwater robot to travel in the first direction from any first position at the bottom of the pool to the second position close to the wall of the pool based on the electrical signal from the ultrasonic radar may include the following steps.

In step S111, the first direction is randomly determined.

Exemplarily, the first direction may be randomly determined. The underwater operator may randomly place the underwater robot at the bottom of the pool. In this example, not only the first position but also the first direction is random. The direction, to which the underwater robot points when it is placed at the bottom of the pool, may be the first direction.

Since the first position where the underwater robot is placed at the bottom of the pool is unknown, the underwater robot may be controlled to travel in the current direction first. In the process of travelling, it may gradually approach the closest position on the wall of the pool, or gradually away from the closest position on the wall of the pool, instead to gradually approach the farther position on the wall of the pool. Nevertheless, no matter in which direction the underwater robot travels, it may eventually approach a position on the wall of the pool.

Alternatively, the operator may place the underwater robot at the bottom of the pool in a specific direction according to work demands. This specific direction may also serve as the first direction. Further alternatively, after the operator randomly places the underwater robot at the bottom of the pool, the direction of the underwater robot may be adjusted. The adjusted direction may also serve as the first direction.

In step S112, the underwater robot is controlled to travel in the first direction from the first position, while a surrounding wall of the pool is detected based on the electrical signal from the ultrasonic radar.

Exemplarily, the underwater robot travels in the first direction from the first position. In the process of the travelling of the underwater robot, the ultrasonic radar emits the ultrasonic signal at a preset frequency. The ultrasonic signal may be used to detect the wall of the pool around the underwater robot. If the distance of the underwater robot to the wall of the pool is within the measuring range of the ultrasonic radar, the ultrasonic radar may receive the feedback signal. In an embodiment, a plurality of ultrasonic radars may be provided at the front, back, left and right of the underwater robot respectively. The plurality of ultrasonic radars may emit ultrasonic signals to different directions to find the position on the wall of the pool that is closest to the underwater robot. In another embodiment, a continuously rotating ultrasonic radar may be provided on the underwater robot. The ultrasonic radar may emit the ultrasonic signal in all directions 360° around the underwater robot to find the position on the wall of the pool that is closest to the underwater robot.

In the process of the travelling of the underwater robot, the ultrasonic signal emitted by the ultrasonic radar is attenuated by the underwater resistance, so the measuring range of the ultrasonic radar is limited. When the underwater robot is far away from the wall of the pool, the ultrasonic signal emitted by the ultrasonic radar may not reach the wall of the pool. At this time, the ultrasonic radar may not receive the feedback signal. Therefore, it may be determined that no wall of the pool is detected and the underwater robot continues moving forward.

In step S113, a second direction is determined when the wall of the pool is detected. In the second direction, the distance between the underwater robot and the detected wall is shortest.

As mentioned above, it may be determined that the underwater robot has already approached the wall of the pool based on the electrical signal from the ultrasonic radar. The underwater robot may be controlled to stop travelling. To facilitate the underwater robot to approach the wall of the pool as soon as possible, the second direction that makes the distance between the underwater robot and the wall of the pool shortest may be determined. Optionally, the second direction is perpendicular to the tangent direction of the wall of the pool. The tangent direction of the wall of the pool is the tangent direction at the position on the wall of the pool that is closest to the underwater robot.

In step S114, the underwater robot is controlled to turn from the first direction to the second direction.

In one example, the connection line between the underwater robot and the detected position of the wall of the pool is taken as a first side. A second side is the straight line in the current direction of the travelling of the underwater robot. The underwater robot is taken as a vertex. According to the first side, the second side and the vertex, the adjustment angle of the travelling direction of the underwater robot is determined to adjust the first direction to be the second direction. In another example, the underwater robot may be positioned by the navigation system thereof to acquire the position coordinates thereof. The acquired position coordinates of the underwater robot are matched to the pool bottom model. The matching method is based on the existing method which is not described here. Based on the matching result, the first direction of the underwater robot is adjusted to be the second direction.

In step S115, the underwater robot is control led to travel to the second position in the second direction.

Exemplarily, after the travelling direction of the underwater robot is adjusted to be the second direction, the underwater robot may be controlled to travel in the second direction. The underwater robot stops travelling after reaching the wall of the pool. The second position is that where the underwater robot stops travelling.

According to the above technical solution, the underwater robot may first travel in any direction, and then in the second direction making the shortest distance to the wall of the pool, until it travels to the second position. In this way, it can be ensured that the underwater robot reaches the wall of the pool more quickly.

Exemplarily, step S110 of controlling the underwater robot to travel in the first direction from any first position at the bottom of the pool to the second position close to the wall of the pool based on the electrical signal from the ultrasonic radar, may also include the following steps.

At the first position, the surrounding wall of the pool is detected based on the electrical signal from the ultrasonic radar. When the wall of the pool is detected, the underwater robot is controlled to travel to the second position in the second direction. When no wall of the pool is detected, the steps from step S111 to step S115 are executed.

In an embodiment, when the underwater robot is located at the first position, the surrounding wall of the pool may be first detected based on the electrical signal from the ultrasonic radar, instead of traveling in any direction. In the case that the wall of the pool has not been detected based on the electrical signal from the ultrasonic radar, the underwater robot may be controlled to execute the above-described steps from S111 to S115. In the case that the wall of the pool is detected based on the electrical signal from the ultrasonic radar, the travelling direction of the underwater robot, namely the second direction, may be determined based on the detected wall of the pool, and then the underwater robot is controlled to travel to the second position in the second direction.

According to the above technical solution, the wall of the pool around the underwater robot is first detected, and then the underwater robot is controlled to travel according to the detection result. In this way, in the case that the first position is close to the wall of the pool, the underwater robot may avoid detours, accordingly improving the control efficiency of the underwater robot.

Affected by water resistance or conditions of the bottom of the pool, the travelling direction of the underwater robot may be offset. Exemplarily, in the process of step S112 of controlling the underwater robot to travel in the first direction from the first position, and/or in the process of step S115 of controlling the underwater robot to travel to the second position in the second direction, a current travelling direction of the underwater robot is acquired in real time by an attitude sensor. And, based on the current travelling direction and a previous moment travelling direction, the travelling direction of the underwater robot is respectively kept in the same direction in each process.

In an embodiment, in the process of executing the above step S112 and/or step S115, the traveling direction of the underwater robot is acquired in real time by the attitude sensor. When the current acquired direction is not consistent with the direction acquired at the previous moment, it is indicated that the current travelling direction needs to be adjusted. The current travelling direction of the underwater robot is adjusted to be the direction acquired at the previous moment. In this way, it may be ensured that the travelling direction of the underwater robot is consistent in the process of executing step S112 and/or step S115 respectively. The attitude sensor is, for example a gyroscope.

According to the above technical solution, in the process of travelling of the underwater robot in a straight line, the current travelling direction of the underwater robot is compared with that at the previous moment. When the two are not consistent, the travelling direction of the underwater robot is adjusted in real time. In this way, it can be ensured that the travelling direction of the underwater robot will not be offset so as to reduce control errors.

Exemplarily, the step S140 of controlling the underwater robot to travel along the spiral path starting from the third position at the bottom of the pool may comprise the following steps. Firstly, the underwater robot is controlled to travel starting from the third position along the wall of the pool for one lap to reach the third position again. Then, circularly executing the following operations until the distance between the underwater robot and the center of the bottom of the pool is less than a distance threshold. From a current position, the underwater robot is controlled to move a first distance toward the center of the bottom of the pool to reach a position closer to the center. And then the underwater robot is controlled to travel starting from this closer position to the center in a lap parallel to the wall of the pool for one lap.

Referring again to FIG. 2B, the underwater robot is first controlled to travel starting from the third position along the wall of the pool for a first lap. Then, the underwater robot returns to the third position. From the third position, the underwater robot is controlled to move the first distance toward the center of the bottom of the pool to reach a fourth position. Relative to the third position, the fourth position is closer to the center of the bottom of the pool. The underwater robot is controlled to travel from the fourth position parallel to the wall of the pool for a second lap. Understandably, the length of the second lap is less than that of the first lap. After the underwater robot returns to the fourth position again, the underwater robot is again controlled to move the first distance toward the center of the bottom of the pool to reach a fifth position. The above operations are repeated until the distance between the underwater robot and the center of the bottom of the pool is less than the distance threshold. In the example shown in FIG. 2B, the underwater robot reaches an nth position.

According to the above technical solution, under the premise that the travelling path of the underwater robot covers the whole bottom of the pool, the sharper turning operation of the underwater robot during travelling is reduced, and accordingly the deceleration operation executed by the underwater robot for the sharper turning operation is reduced. Thus, the loss of underwater robots is reduced and its life is increased.

Exemplarily, the method may further comprise: while executing step S140 of controlling the underwater robot to travel along the spiral path starting from the third position at the bottom of the pool, controlling the underwater robot to execute an operation at a preset width to complete the operation for the bottom of the pool. The first distance is equal to a product of the preset width and a proportional coefficient, and the proportional coefficient is 0.8~1.

In an embodiment, the underwater robot is a sweeping robot for cleaning the bottom of the pool during travelling. For example, the underwater robot may be equipped with a cleaning mechanism. The cleaning mechanism is rotatable around a horizontal axis. During the travelling of the underwater robot, the bottom of the pool is cleaned by the rotation operation of the cleaning mechanism. The preset width may be the width of the cleaning mechanism. In the process of cleaning by the sweeping robot, each time the sweeping robot cleans one lap at the bottom of the pool, it moves the first distance toward the center of the bottom of the pool. The first distance L may be calculated by the following formula: L=W*K, Wherein, W represents the preset width, and K represents the proportional coefficient. Optionally, the value range of the proportional coefficient K may be [0.8, 1]. Further, it can be understood that when K is less than 1, there is an overlapping area in the cleaning range of the (i+1)th lap of the cleaning operation and the ith lap of the cleaning operation of the sweeping robot. Furthermore, the value range of the proportional coefficient K may be [0.9, 0.95]. As a result, the overlapping operation area of the underwater robot accounts for 5% to 10% of the total operation area.

In the above technical solution, the length of the travelling path of the underwater robot may be reduced under the premise that the operation range of the underwater robot covers the whole bottom of the pool. In other words, the solution can not only ensure the operation quality of the underwater robot but also take into account the operation efficiency.

The above pool bottom model may be obtained in various ways. For example, it may be obtained via a network from other computing devices, such as a server. Exemplarily, the method 100 may further comprise any of the following steps to generate the pool bottom model.

In step S101, the pool bottom model is generated by setting size parameters of an edge profile of the bottom of the pool. In other words, the pool bottom model is generated in response to a setting operation by a user by which the size parameters may, be set.

Exemplarily, the pool bottom model is preset in an intelligent terminal according to the edge profile of the bottom of the pool. For example, the size of the edge profile shape of the bottom of the pool is input in the intelligent terminal. Specifically, for the case where the edge profile shape of the bottom of the pool is rectangular, the values of the length and width of the rectangle may be input. In response to the input operation by the user, a rectangular pool bottom model may be generated.

In step S102, an image of the bottom of the pool is collected and the pool bottom model is generated based on the image.

Exemplarily, an image collection device may be used to take pictures of the bottom of the pool. Then, based on the collected picture, three-dimensional modeling is executed to generate the pool bottom model.

In step S103, the underwater robot is controlled to travel along the wall of the pool for at least one lap at the bottom of the pool. At the same time, the position and the posture of the underwater robot is detected in real time. The pool bottom model is generated based on the position and posture detection result.

Exemplarily, the underwater robot may be placed anywhere close to the wall of the pool. The underwater robot is controlled to travel along the wall of the pool for one lap, and at the same time, the position information and posture information of the underwater robot is detected by a position-posture sensor provided on the underwater robot in real time. The pool bottom model may be generated based on the detected position information and posture information.

According to the above technical solutions, the generated pool bottom model is more accurate. Further, the travelling path of the underwater robot at the bottom of the pool can be more accurate, so that the underwater robot can more ideally traverse the whole bottom of the pool.

Exemplarily, for the pool bottom model generated based on the image, the pool bottom model may be amended. After step S102 of collecting the image of the bottom of the pool and generating the pool bottom model based on the image, the method may further include the following steps. The underwater robot is controlled to travel at the bottom of the pool along the wall of the pool for at least one lap. At the same time, the position of the underwater robot is detected in real time to obtain a position detection result, i.e., a real time position. The edge profile of the bottom of the pool is determined based on the position detection result. The pool bottom model is amended based on the determined edge profile. In the process of the travelling of the underwater robot along the wall of the pool, the real time position of the underwater robot may be detected by the position sensor. According to the position detection result, the edge profile of the bottom of the pool may be determined. The feature differences are compared between the edge profile and the pool bottom model generated based on the image. The pool bottom model is amended according to the feature differences.

According to the above technical solution, the pool bottom model generated based on the image can be evaluated. Based on the evaluation result, the pool bottom model can be amended. This method can make the generated pool bottom model more consistent with the bottom of the pool, and improve the accuracy of the acquired position of the underwater robot, and accordingly ensure that the underwater robot traverses the whole bottom of the pool.

Exemplarily, the operating method 100 may further include the following steps S150, S160 and S170, In step S150, while controlling the underwater robot to travel along the spiral path starting from the third position at the bottom of the pool, the travelling path of the underwater robot is displayed in real time in a path display area of a graphical user interface. Exemplarily, while executing step S140, the travelling path of the underwater robot is synchronously displayed in the graphical user interface of the intelligent terminal. The graphical user interface may include the path display area for displaying the travelling path of the underwater robot. The graphical user interface may also include an operable control for receiving instructions from the user. Optionally, in the path display area, the area that the underwater robot has already passed at the bottom of the pool and that not yet reached are displayed in different styles, for example, different colors, patterns and so on.

In step S160, the evaluation information of the travelling path of the underwater robot is acquired.

Exemplarily, according to the real-time displayed travelling path of the underwater robot, it may be determined whether the travelling path of the underwater robot has missed some areas, for example, whether there is any space between the adjacent travelling paths of the underwater robot. Understandably, in the above example, the ith lap and the (i+1)th lap of the spiral path generated during the underwater robot travelling at the bottom of the pool are adjacent travelling paths. Optionally, the graphical user interface may include the operable control for receiving the evaluation information from the user on the travelling path. The user may do evaluation on the travelling path of the underwater robot according to whether the travelling path displayed in the graphical user interface covers the whole bottom of the pool. Alternatively, the travelling path of the underwater robot may be automatically evaluated.

Optionally, the acquisition operation of step S160 may be executed in the process of travelling of the underwater robot. Thus, the travelling of the underwater robot may be optimized. Optionally, the acquisition operation of step S160 may also be executed after the underwater robot stops travelling. In this way, the evaluation information is used to optimize a future traveling path of the underwater robot.

In step S170, control parameters are optimized based on the evaluation information. The control parameters are used to control the underwater robot to travel along the spiral path thereafter.

Exemplarily, the control parameters of the underwater robot may be further optimized on the basis of the acquired evaluation information. The control parameters may be used to subsequently control the underwater robot to travel along the spiral path. The control parameters may include travelling speed and moving distance of the underwater robot and so on. The moving distance includes the distance that the underwater robot moves to the center of the bottom of the pool after travelling each lap along the spiral path.

Based on the above evaluation method, the travelling path of the underwater robot may be evaluated. Then, the control parameters of the underwater robot may be timely adjusted according to the evaluation result, so as to improve the planning of the next travelling path of the underwater robot. In this way, the control quality of the underwater robot may be improved to ensure that its travelling path covers the whole bottom of the pool.

Exemplarily, the control parameters may comprise a distance parameter between adjacent paths in the spiral path. The step S150 of displaying the travelling path of the underwater robot in real time in the graphical user interface may comprise steps S151 and S152.

In step S151, the path display area is rasterized. For example, in the path display area, a plurality of grids is displayed.

In step S152, the travelling path is displayed in the path display area in real time, wherein the grids corresponding to the passed portion of the travelling path and the grids corresponding to the un-passed portion of the travelling path are displayed in different styles.

In an embodiment, the passed and un-passed portions of the travelling path of the underwater robot are distinguished by different display styles. For example, all of the grids appear dark before the travelling of the underwater robot. In the process of the travelling of the underwater robot, the grids corresponding to the passed portion of the travelling path appear as a bright color.

Figure 3:
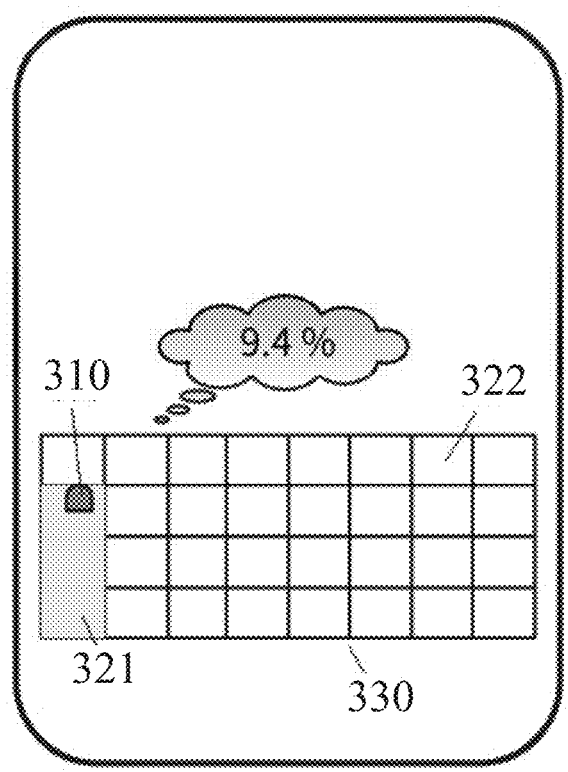
FIG. 3 illustrates a schematic diagram of a path display area according to an embodiment of the present application.
Figure 4:
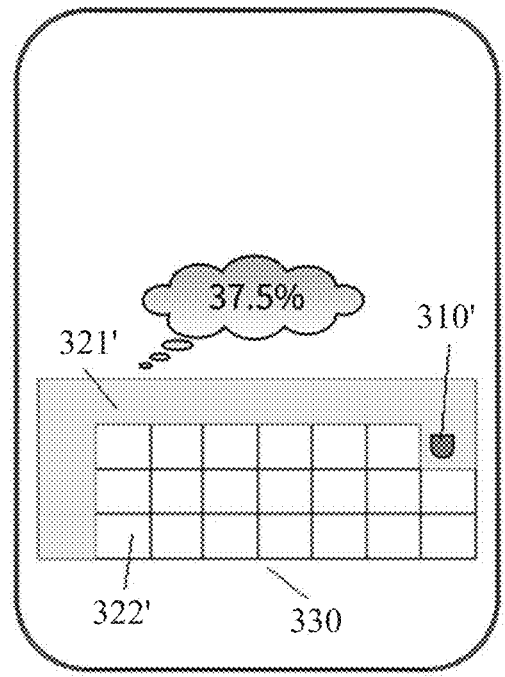
FIG. 4 illustrates a schematic diagram of a path display area according to another embodiment of the present application.

FIGS. 3 and 4 respectively show a schematic diagram of a path display area according to an embodiment of the present application. The underwater robot may be a sweeping robot that is used to clean the pool shown in the path display area. As shown in FIG. 3, the pool 330 shown in the path display area is rasterized into grids of 4×8. The sweeping robot 310 has completed the cleaning work of 3 grids, and the cleaned area 321 is displayed in a dark color. The un-cleaned area 322 is displayed in a bright color, wherein the individual grids are clearly visible. As shown in FIG. 4, the pool 330 shown in the path display area is also rasterized into the grids of 4×8. The sweeping robot 310' has completed the cleaning work of 12 grids, and the cleaned area 321' is displayed in a dark color. The un-cleaned area 322' is shown in a bright color, wherein the individual grids are clearly visible.

Exemplarily, step S160 of acquiring the evaluation information of the travelling path of the underwater robot includes: determining the evaluation information based on the proportion of the number of the grids corresponding to the passed portion of the travelling path to the total number of the grids after the underwater robot stops travelling. The step S170 of optimizing the control parameters based on the evaluation information includes adjusting the distance parameter when the number of the grids corresponding to the passed portion of the travelling path does not reach 100% of the total number of the grids.

In an embodiment, the evaluation information may be represented by a travelling progress. The travelling progress may be expressed as the number of the grids corresponding to the passed portion of the travelling path divided by the total number of the grids multiplied by 100%. Referring again to FIG. 3, the sweeping robot 310 has cleaned 3 grids. The travelling progress is shown as 9.4%. As shown in FIG. 4, the sweeping robot 310' has cleaned 12 grids along the wall of the pool. The travelling progress is shown as 37.5%. Understandably, when the sweeping robot completes the cleaning operation, the travelling progress should reach 100%. When the travelling progress has not reached 100%, it means that at least a part of the area at the bottom of the pool has not yet been cleaned by the sweeping robot. At this point, the distance parameter, for example, the degree of overlapping between the adjacent travelling paths may be adjusted.

According to the above technical solution, the path display area is rasterized. As a result, the user may see the travelling path of the underwater robot at a glance. Based on the proportion of the number of the grids corresponding to the passed portion of the travelling path to the total number of the grids, the distance parameter of the underwater robot is adjusted in time. In this way, it can be ensured that the travelling path of the underwater robot covers the whole bottom of the pool. Further, the operation quality of the underwater robot can be improved.

Exemplarily, as described above, while controlling the underwater robot to travel along the spiral path starting from the third position at the bottom of the pool, the underwater robot may be controlled to execute an operation to complete the operation for the bottom of the pool. The above-mentioned graphical user interface may also include the operable controls. The control parameters may include travelling area, travelling speed and/or operation intensity. The step S150 of displaying the travelling path of the underwater robot in real time in the path display area of the graphical user interface may include the above-mentioned steps S151 and S152.

The step S160 of acquiring the evaluation information of the travelling path of the underwater robot may include: determining the evaluation information in response to an operation on the operable controls by the user. The evaluation information includes an operation quality score for an area corresponding to at least a part of the grids in the path display area. The step S170 of optimizing the control parameters based on the evaluation information may include: adjusting the travelling area, the travelling speed and/or the operation intensity based on the operation quality score.

Figure 5:
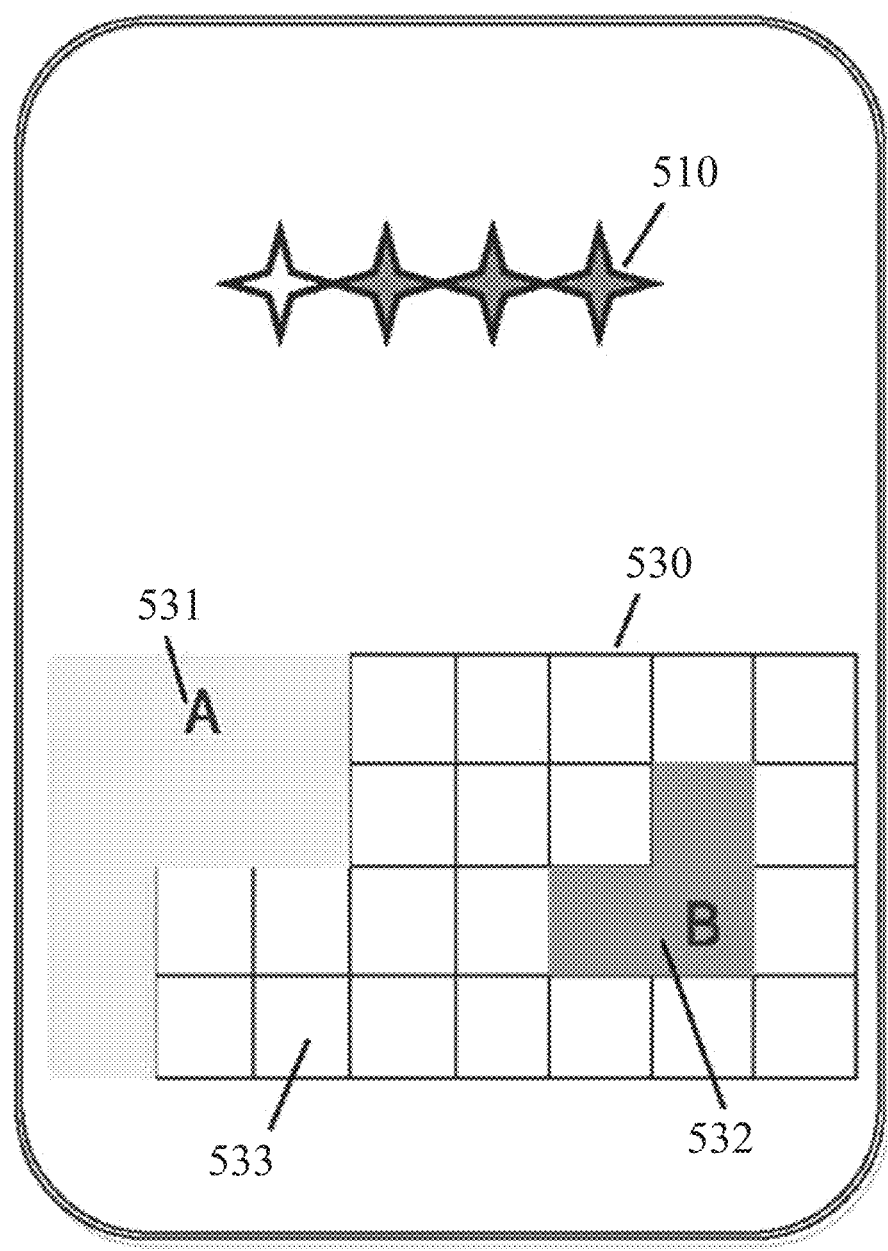
FIG. 5 illustrates a schematic diagram of a graphical user interface according to an embodiment of the present application.

FIG. 5 illustrates a schematic diagram of a graphical user interface according to an embodiment of the present application, which may include operable controls. The operable controls may be used for receiving the evaluation information of the user on the current area in respond to the operation of the user. Exemplarily, by clicking on different areas, the user may select the area currently intended to be evaluated. The user may score the operation quality for the current area with the operable controls. Taking the sweeping robot as an example, if the current area is considered to be swept thoroughly and clean, a higher operation quality score may be given, otherwise, vice versa. Referring to FIG. 5, the four stars in the figure show the operation quality score 510 in different display styles. White stars indicate the current quality score of the user. One white star indicates 25 points, and four white stars indicate a full score of 100 points. Referring again to FIG. 5, the operation quality score by the user is 75 points. Understandably, there may be different operation quality scores for different areas. In the path display area, the areas with different operation quality scores as well as un-scored areas may be displayed in different styles. At the bottom of the pool 530, "A" area 531 is a very satisfactory one, "B" area 532 is an unsatisfactory one, and Blank area 533 is an un-scored one.

According to the operation quality scores from the user, the control parameters such as travelling area, travelling speed and/or operation intensity of the underwater robot may be adjusted. In this way, the operation of the underwater robot can be optimized. For example, when the bottom of the pool is cleaned, optimization can be realized in one or more ways by selecting to, such as reduce the travelling speed, increase the sweeping intensity, and repeat travelling for the areas with a lower score. Specifically, the underwater robot may be controlled to return "B" area 532 after traversing the whole bottom of the pool 530. The steps S110 to step 5140 may be executed again for the above-described "B" area 532 to repeat the travelling and sweeping again there.

According to the above technical solution, the operation quality may be scored and the operation of the underwater robot may be optimized according to the scoring result. In this way, the operation quality of the underwater robot can be efficiently improved.

According to another aspect of the present application, an underwater robot is provided. The underwater robot comprises a vehicle body and a processor. The vehicle body may be substantially rectangular-shaped, ship-shaped, cylindrical-shaped, or various other shapes, which are not limited by this application. The processor may be implemented by a digital signal processor (DSP), a field programmable gate array (FPGA), a programmable logic array (PLA), a microprocessor, etc. The vehicle body is provided with at least one ultrasonic radar and a moving device. The moving device may provide support for the vehicle body and carry the vehicle body for movement. The moving device may include a motor and wheels, etc. The motor may be one of various motors known in the art or that may appear in the future, including but not limited to DC motors. The wheels may be universal wheels. In one embodiment, the wheels may be three or four. The wheels may be evenly distributed over the bottom contour of the vehicle body.

The processor is in communication with the at least one ultrasonic radar and configured to generate, in response to an electrical signal of the ultrasonic radar, at least one control signal to control the moving device to move the vehicle body at a bottom of a pool. The processor may be used to control the underwater robot to traverse the bottom of the pool using the ultrasonic radar and based on the above-mentioned operating method.

In one embodiment, the processor may receive an electrical signal from the ultrasonic radar. Based on this electrical signal, the processor may generate a control signal. The control signal may control the operation of the motor to drive the wheels to carry the vehicle body for movement. For example, in the previously described embodiment, during the underwater robot is traveling in a first direction from any first position at the bottom of the pool, the ultrasonic radar may detect the position of the wall of the pool. When the wall of the pool is detected, the processor may determine based on the electrical signal from the ultrasonic radar that the underwater robot reaches the second position close the wall of the pool. Then the processor may generate a control signal. Based on this control signal, the underwater robot may be controlled to travel from the second position along the wall of the pool to a third position to generate an along-wall path. The processor may compare the along-wall path with a pool bottom model and determine the position information of the third position in the pool bottom model. Finally, the processor may control the underwater robot to travel along a spiral path starting from the third position at the bottom of the pool to traverse the whole bottom of the pool based on the pool bottom model.

Optionally, the underwater robot includes a plurality of ultrasonic radars facing different directions respectively. For example, the ultrasonic radar may be four. These four ultrasonic radars may face the front, the back, the left side, and the right side of the vehicle body respectively.

Exemplarily, the first direction of the underwater robot may be randomly, determined by the processor at first. The plurality of ultrasonic radars may be used for detecting a surrounding wall of the pool during the underwater robot traveling in the first direction from the first position. When the wall of the pool is detected, the processor may determine a second direction in which the distance between the underwater robot and the detected wall is shortest, and control the underwater robot to turn from the first direction to the second direction. Then the processor may control the underwater robot to travel to the second position in the second direction.

In the above solution, the ultrasonic signals can be emit in the plurality of directions. So the wall of the pool can be detected faster. As a result, the underwater robot can be more accurately controlled.

Alternatively, the underwater robot includes only one ultrasonic radar, which is rotatable relative to the vehicle body of the underwater robot. The ultrasonic radar may rotate 360° relative to the vehicle body. Similar to the plurality of ultrasound radars described above, the rotatable ultrasonic radar can detect the walls of the pool located in multiple directions. Moreover, the direction in which the ultrasonic radar emits the ultrasound signals is continuously changing, so that the wall can be detected more quickly.

In the above embodiment, the rotatable ultrasonic radar can emit ultrasonic signals in continuously changing direction. This ensures faster detection of the wall of the pool, which in turn ensures more accurate control of the underwater robot. In addition, the underwater robot is provided with only one ultrasonic radar, which can reduce its cost.

Optionally, the underwater robot further includes an attitude sensor configured to acquire a current travelling direction of the underwater robot in real time. Based on the current travelling direction and a previous moment travelling direction of the underwater robot, which are both acquired by the attitude sensor, the travelling direction of the underwater robot can be kept in the same direction during straight-line traveling process, for example the above process of executing the step S112 and/or the step S115.

The attitude sensor can ensure that the travelling direction of the underwater robot remains as constant as desired. As a result, precise operation of the underwater robot is ensured.

Optionally, the attitude sensor includes a gyroscope, an accelerometer and/or an electronic compass.

These attitude sensors are able to accurately detect the attitude of the underwater robot and are technologically mature and less costly. Thus, it is ensured that the underwater robot can travel in the desired direction, and the cost of the underwater robot is reduced accordingly.

Optionally, the underwater robot further includes a communication device. The communication device connects with the processor and is configured to output the travelling path of the underwater robot to a computing device, to display the travelling path on a display of the computing device.

Exemplarily, the computing device may be any one of a computer, a tablet, a mobile phone, etc. The computing device may include a display.

The processor of the underwater robot may communicate with a computing device via the communication device. Thus the travelling path of the underwater robot may be output to the computing device in real time. A graphical user interface may be displayed on the display of the computing device. The travelling path of the underwater robot may be displayed in the graphical display interface in real time. The travelling path may be displayed on the display of the computing device for the user to see. Exemplarily, the processor may acquire evaluation information of the travelling path of the underwater robot from the computing device, which may be input by the user. Then the processor may optimize control parameters based on the evaluation information, wherein the control parameters are used to control the underwater robot to travel along the spiral path thereafter.

The travelling path of the underwater robot can be transmitted to the computing device for display. This allows the user to easily understand the underwater travelling of the underwater robot, In turn, the user can determine whether adjustments need to be made for the control parameters of the underwater robot based on what is known, thus ensuring the quality of the underwater operation of the underwater robot.

Exemplarily, the underwater robot is used to clean the bottom of the pool in the process of the travelling. In other words, the underwater robot may be a cleaning robot.

According to yet another aspect of the present invention, a non-volatile storage medium is provided. The non-volatile storage medium stores program instructions, and when the program instructions are run, the operating method of the underwater robot based on ultrasonic radar is executed. The non-volatile storage medium may include, for example, a storage component of a tablet computer, a hard disk of a personal computer, a read-only memory (ROM), an erasable programmable read-only memory (EPROM), a portable compact disc read-only memory (CD-ROM), and a USB memory, or any combination thereof. The computer-readable storage medium may be any, combination of one or more computer-readable storage media.

By reading the above description of the operating method of the underwater robot based on ultrasonic radar, those skilled in the art can understand the specific implementation solution of the above underwater robot and a non-volatile storage media, which will not be repeated herein for the sake of simplicity.

Although exemplary embodiments have been described herein with reference to the accompanying drawings, it is to be understood that the exemplary embodiments described above are merely exemplary and are not intended to limit the scope of the present invention thereto. Various changes and modifications may be made therein by those of ordinary skill in the art without departing from the scope and spirit of the present invention. All the changes and modifications are intended to be included within the scope of the present invention as claimed in the appended claims.

Those of ordinary skill in the art may appreciate that the modules and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Those professional and skilled persons can use different methods to implement the described functions for each specific application, but such implementation should not be considered as going beyond the scope of the present invention.

In several embodiments provided in the disclosure, it should be understood that the disclosed devices and methods may be implemented in other ways. For example, the device embodiments described above are merely illustrative, for example, the division of the modules is merely a division of logical functions, and there may be other divisions in actual implementation, for example, a plurality of modules or components may be combined or integrated into another device, or some features may be ignored or not implemented.

Numerous specific details are set forth in the description provided herein. However, it can be appreciated that the embodiments of the present invention can be practiced without these specific details. In some examples, well-known methods, structures and techniques are not shown in detail in order not to obscure the understanding of this specification.

Similarly, it is to be appreciated that in order to simplify the present invention and aid in understanding one or more of the various aspects of the inventive, in the description of the exemplary embodiments of the present invention, the various features of the present invention are sometimes grouped together into a single embodiment, figure, or description thereof. However, the method of the present invention should not be interpreted as reflecting the intention that the claimed invention requires more features than those explicitly recited in each claim. More precisely, as reflected in the corresponding claims, the inventive points may lie in that the technical problems may be solved with the corresponding features less than all features of a single disclosed embodiment. Thus, the claims following the specific embodiments are explicitly incorporated into the specific embodiments, wherein each claim itself serves as a separate embodiment of the present invention.

Those skilled in the art will appreciate that all features disclosed in this specification (including the appended claims, abstract and drawings), and all processes or modules of any method or devices, may be combined in any combination, except that there is mutual exclusion therebetween. Each feature disclosed in this description (including the appended claims, abstract and drawings) may be replaced by an alternative feature serving the same, equivalent or similar purpose, unless indicated clearly otherwise.

Furthermore, those skilled in the art can appreciate that while some embodiments described herein include certain features included in other embodiments but not others, combinations of features of different embodiments means to be within the scope of the present invention and to form different embodiments. For example, in the claims, any of the claimed embodiments may be used in any combination.

Various component embodiments of the present invention may be implemented by hardware, or by software modules running on one or more processors, or by a combination thereof. Those skilled in the art will appreciate that some or all functions of some modules in the underwater robot according to the embodiments of the present invention may be implemented in practice by a microprocessor or a digital signal processor (DSP). The present invention may also be implemented as a device program (for example, computer program and computer program product) for executing part or all of the methods described herein. Such a program for implementing the present invention may be stored on a computer-readable medium or may take the form of one or more signals. Such a signal may be downloaded from an Internet website, or provided by a carrier signal, or provided in any other form.

It should be noted that the above-described embodiments illustrate rather than limit the present invention and that alternative embodiments may be devised by those skilled in the art without departing from the scope of the appended claims. In the claims, any reference signs placed between parentheses shall not be construed as limiting the claims. The word "comprising" does not exclude the presence of elements or steps not listed in the claims. The word "a" or "an" preceding an element does not exclude the presence of a plurality of such elements. The present invention may be implemented by means of hardware including several different elements and by means of a suitably programmed computer. In the device claim enumerating several modules, several of the modules may be embodied in the same item of hardware. The use of words, "first", "second", "third", etc., does not indicate any order. These words may be interpreted as names.

The foregoing description, merely being specific embodiments of the present invention or descriptive of the specific embodiments, is not intended to limit the protection scope of the present invention. Any change or substitution, Which may readily occur to those skilled in the art, within the technical scope disclosed in the present invention is intended to be encompassed within the protection scope of the present invention. The protection scope of the present invention shall be subject to the protection scope of the claims.

What is claimed is:

1. An operating method of an underwater robot based on ultrasonic radar, comprises the following steps:
   S110, controlling the underwater robot to travel in a first direction from any first position at a bottom of a pool to a second position close to a wall of the pool based on an electrical signal from the ultrasonic radar;
   S120, controlling the underwater robot to travel from the second position along the wall of the pool to a third position to generate an along-wall path;
   S130, comparing the along-wall path with a pool bottom model, and determining the position information of the third position in the pool bottom model; and
   S140, controlling the underwater robot to travel along a spiral path starting from the third position at the bottom of the pool to traverse the whole bottom of the pool based on the pool bottom model.

2. The operating method according to claim 1, wherein the step S110 includes:
   S111, randomly determining the first direction;
   S112, controlling the underwater robot to travel in the first direction from the first position, while detecting a surrounding wall of the pool based on the electrical signal from the ultrasonic radar;
   S113, when the wall of the pool is detected, determining a second direction in which the distance between the underwater robot and the detected wall is shortest;
   S114, turning from the first direction to the second direction; and
   S115, controlling the underwater robot to travel to the second position in the second direction.

3. The operating method according to claim 2, wherein the step S110 further includes:
   at the first position, detecting a surrounding wall of the pool based on the electrical signal from the ultrasonic radar;
   when the wall of the pool is detected, defining the first direction to be the second direction, and controlling the underwater robot to travel to the second position in the second direction;
   when no wall is detected, executing the steps from the step 111 to the step 115.

4. The operating method according to claim 2, wherein the method further includes:
   in the process of controlling the underwater robot to travel in the first direction from the first position, and/or in the process of controlling the underwater robot to travel to the second position in the second direction, acquiring a current travelling direction of the underwater robot in real time by an attitude sensor; and based on the current travelling direction and a previous moment travelling direction, keeping the travelling direction of the underwater robot in the same direction in each process respectively.

5. The operating method according to claim 1, wherein the step S140 includes:
   controlling the underwater robot to travel starting from the third position along the wall of the pool for one lap to reach the third position again;
   circularly executing the following operations until the distance between the underwater robot and the center of the bottom of the pool is less than a distance threshold;
   from a current position, controlling the underwater robot to move a first distance toward the center of the bottom of the pool to reach a position closer to the center;
   controlling the underwater robot to travel starting from the closer position to the center in a lap parallel to the wall of the pool for one lap.

6. The operating method according to claim 5, wherein the method further includes:
   while controlling the underwater robot to travel along the spiral path starting from the third position at the bottom of the pool, controlling the underwater robot to execute an operation at a preset width to complete the operation for the bottom of the pool, wherein the first distance is equal to a product of the preset width and a proportional coefficient; and wherein the proportional coefficient is 0.8~1.

7. The operating method according to claim 1, wherein the method further includes:
   S101, generating the pool bottom model by setting size parameters of an edge profile of the bottom of the pool;
   S102, collecting an image of the bottom of the pool and generating the pool bottom model based on the image; or
   S103, controlling the underwater robot to travel along the wall of the pool for at least one lap at the bottom of the pool; and at the same time; detecting a position and posture of the underwater robot in real time and generating the pool bottom model based on the position and posture detection result.

8. The operating method according to claim 7, wherein after the step S102, the method further includes:
   controlling the underwater robot to travel at the bottom of the pool along the wall of the pool for at least one lap;
   while detecting a real time position of the underwater robot, and determining the edge profile of the bottom of the pool based on the position detection result;

amending the pool bottom model based on the determined edge profile.

9. The operating method according to claim 1, wherein the method further includes:
S150, while controlling the underwater robot to travel along the spiral path starting from the third position at the bottom of the pool, displaying the travelling path of the underwater robot in real time in a path display area of a graphical user interface;
S160, acquiring evaluation information of the travelling path of the underwater robot; and
S170, optimizing control parameters based on the evaluation information, wherein the control parameters are used to control the underwater robot to travel along the spiral path thereafter.

10. The operating method according to claim 9, wherein the control parameters comprise a distance parameter between adjacent paths in the spiral path,
said step S150 includes:
rasterizing the path display area;
displaying the travelling path in the path displaying area in real time, wherein the grids corresponding to the passed portion of the travelling path and the grids corresponding to the un-passed portion of the travelling path are displayed in different styles;
said step S160 includes:
determining the evaluation information based on the proportion of the number of the grids corresponding to the passed portion of the travelling path to the total number of the grids after the underwater robot stops travelling;
said step S170 includes:
adjusting the distance parameter when the number of the grids corresponding to the passed portion of the travelling path does not reach 100% of the total number of the grids.

11. The operating method according to claim 9, wherein the method further includes:
while controlling the underwater robot to travel along the spiral path starting from the third position at the bottom of the pool, controlling the underwater robot to execute an operation to complete the operation for the bottom of the pool;
the graphical user interface further includes operable controls;
the control parameters include travelling area, travelling speed and/or operation intensity;
said step S150 includes:
rasterizing the path display area;
displaying the travelling path in the path displaying area in real time, wherein the grids corresponding to the passed portion of the travelling path and the grids corresponding to the un-passed portion of the travelling path are displayed in different styles;
said step S160 includes:
determining the evaluation information in response to an operation on the operable controls by the user, and the evaluation information includes an operation quality score for an area corresponding to at least a part of the grids in the path display area;
said step S170 includes:
adjusting the travelling area, the travelling speed and/or the operation intensity based on the operation quality score.

12. A non-volatile storage medium with program instructions stored thereon, wherein the program instructions when running are used to execute the control method of claim 1.

13. The operating method according to claim 1, wherein the ratio of the length of the along-wall path to the circumference of the bottom of the pool is 0.2~2.

14. An underwater robot comprising:
a vehicle body provided with at least one ultrasonic radar and a moving device; and
a processor in communication with the at least one ultrasonic radar and configured to generate, in response to an electrical signal of the ultrasonic radar, at least one control signal to control the moving device to move the vehicle body at a bottom of a pool, wherein the underwater robot further includes a communication device connected with the processor and configured to output the travelling path of the underwater robot to a computing device, to display the travelling path on a display of the computing device.

15. The underwater robot according to claim 14, wherein the underwater robot is used to clean the bottom of the pool while the underwater robot is travelling.

16. The underwater robot according to claim 14, wherein the underwater robot includes a plurality of ultrasonic radars facing different directions respectively.

17. The underwater robot according to claim 14, wherein the underwater robot includes one ultrasonic radar, which is rotatable relative to the vehicle body.

18. The underwater robot according to claim 14, wherein the underwater robot further includes an attitude sensor configured to acquire a current travelling direction of the underwater robot in real time.

19. The underwater robot according to claim 18, wherein the attitude sensor includes a gyroscope, an accelerometer and/or an electronic compass.

* * * * *